Figure 1:
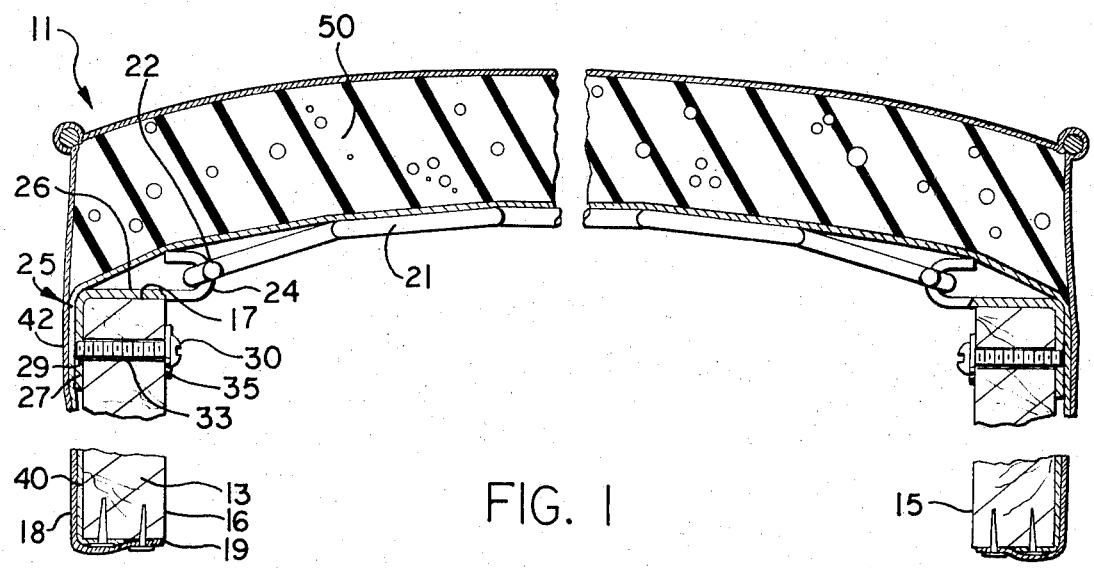

United States Patent [19]
Higbea

[11] 3,858,858
[45] Jan. 7, 1975

[54] ANCHOR BRACKET FOR FURNITURE SPRINGS

[76] Inventor: George E. Higbea, 1405 N. Scott St., Napoleon, Ohio 43545

[22] Filed: Mar. 23, 1973

[21] Appl. No.: 344,272

[52] U.S. Cl. ............................................. 267/110
[51] Int. Cl. ............................................. F16f 3/02
[58] Field of Search .................... 267/110, 111, 112

[56] References Cited
UNITED STATES PATENTS

| | | | |
|---|---|---|---|
| 3,165,308 | 1/1965 | Rathbun | 267/111 |
| 3,276,801 | 10/1966 | Jones | 267/110 |
| 3,338,572 | 8/1967 | Schutz et al. | 267/110 |

*Primary Examiner*—James B. Marbert

[57] ABSTRACT

A novel anchor bracket for zigzag support springs for furniture is securable to frame of fully erected furniture without disassembly and/or removal of decorative fabrics or coverings; the bracket including a pair of normally disposed connected legs, one of which is slidable about upper edge of furniture frame and down into abutment with outer surface of frame, the second leg having zigzag spring securement recess formed therein and said first-mentioned leg having threaded hole adapted to receive matchingly threaded machine screw extending through predrilled hole in frame from inner side thereof and said screw engaging said threaded hole to secure the bracket securely whereby defective and/or broken springs may be replaced easily.

4 Claims, 2 Drawing Figures

PATENTED JAN 7 1975 3,858,858

ANCHOR BRACKET FOR FURNITURE SPRINGS

The present invention relates generally to furniture structure and more particularly to springs and to brackets employed in securing the springs to the furniture.

A number of various types of furniture feature a spring-supported seat in which the spring is a zigzag metal member which is anchored at each end on opposed parallel frames in a prestretched state wherein the spring is arched upwardly to resist the weight or load of the one sitting in the furniture. It is to be understood, of course, that a plurality of these springs are employed in side-by-side relationship to provide, in aggregate, a support which is covered with suitable padding, binding and decorative fabrics together with suitable accent hardware or the like. Brackets and clips for securing the zigzag-type spring to furniture frames are commercially available and are presently of a variety of different types. Reference may be had to the following patents for a description of the zigzag-type springs, the clips and brackets for securing them to furniture and the techniques for attaching the clips and brackets to the various frames. These patents include U.S. Pat. No. 3,276,801; 2,542,458; 3,519,261; 2,716,422 and 3,199,163. The brackets or clips, for engagement of the terminal ends of the zigzag springs, of the type illustrated in the several patents are designed for securement to the frame members in the course of manufacture of the furniture; that is, before final assembly and application of the paddings and coverings, both functional and decorative.

Unfortunately, it is found that the springs of a particular piece of furniture will break or become deformed or otherwise rendered unsuitable or undesirable after varying times of exposure to use, necessitating replacement of the spring or insertion or replacement of a spring which has either become damaged or even lost. It is also frequently found that present brackets and anchor clips become loosened from the frame member; as a result of which, the zigzag spring no longer functions to support the intended load. Employing the clips or brackets known to date and/or as illustrated in the above patents, one is required to practically rebuild the piece of furniture. This is due to the design of the present brackets and clips which must be fastened to the top of the wood frame; this not being feasible without removing said outer covering. Thus, it must be appreciated that the zigzag springs are subjected to a considerable stress and load, necessitating firm and secure anchoring to avoid failure of the spring. Thus, the spring/clip anchor devices known to date have certain design features for securing them to the furniture frame member such that replacement necessitates removal of the fabric, the padding and related springs in order that the appropriate surfaces of the frame may be exposed for attachment of the bracket or clip to the frame.

It is an object of the present invention to provide a particularly novel anchor bracket or clip which can be mounted onto furniture frame members witout disruption or removal of paddings and fabrics.

It is still another object of the present invention to provide such an anchor or anchor clip bracket which can be applied or fastened without disassembly of any of the furniture members, such as arms, spokes, decor accessories and the like.

It is still another object of the present invention to provide such a spring anchor clip or bracket which is characterized by firm and improved securement to the frame such that dislodgement or accidental removal undr service conditions is precluded.

Figure 2:
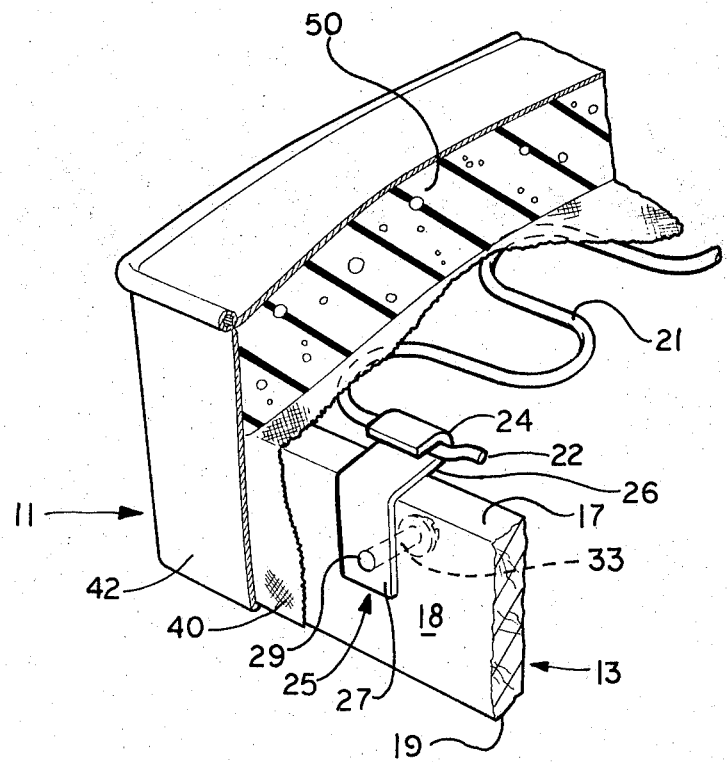

The foregoing as well as other objects of the present invention will become apparent to those skilled in the art from the following detailed description taken in conjunction with the annexed sheet of drawings on which there is presented, for purpose of illustration only, one embodiment of the present invention. In the drawings:

FIG. 1 is a side elevation view, in section, of a chair seat incorporating an improved anchor bracket for zigzag springs in accordance with the present invention; and FIG. 2 is a three-quarter perspective view similar to FIG. 1 but having parts of the furniture broken away in order to illustrate more clearly the novel anchor bracket of the present invention.

Considered in its most simple embodiment, the present invention envisions a L-shaped bracket, one leg having a reverse bend in the extremity thereof for attachment with the terminal end of a zigzag spring and the other leg being insertable without disruption of furniture components over the top edge of a given frame member, down into surface abutment with the exterior surface of the frame but inside of any padding or decorative fabric, said leg having a predrilled and pretapped hole or holes therein which can be located in registration with a predrilled hole in the frame and engageable by a machine screw inserted through the frame from the inside, said pretapped hole in the bracket leg having a thread pitch as to be engageable by the machine screw so that tightening thereof urges the leg into firm surface abutment with the frame.

Reference may now be had to the drawings for a more detailed description of the invention.

In FIG. 1, reference numeral 11 identifies a seat ccomposed of spaced horizontal frames 13 and 15. Frame member 13 includes an inner vertical surface 16, an upper horizontal edge 17, an outer vertical surface 18 and a horizontal bottom edge 19. Reference numeral 21 identifies a zigzag spring; the terminal end of which 22 is mounted in a recess 24 formed by a reverse bend in the upper leg 26 of bracket 25. The bracket 25 includes a leg 27 connected to leg 26 and formed by simply bending what was originally an elongate strip of metal about a transverse axis until the two legs are perpendicular. Leg 27 contains a centrally located aperture 29 which is threaded in a direction receptive of machine screw 30 which extends through frame 13 via a predrilled hole 33. An optical machine washer 35 abuts the inner surface 16 of the leg to spread any forces or stresses over the larger area. Reference numeral 40 identifies a cushion fabric, while reference numeral 42 identifies a decorative fabric. The cushion fabric 40 extends about the frame member and is tacked to the bottom edge 19 as shown or to the side 18. The fabric extends upwardly across the springs, about the opposed frame member 15 to which it is secured at the opposite bottom edge thereof as shown or to the opposite side 18. A seat cushion of expanded polyurethane or rubber-like foam or cotton or sisal 50 is positioned on top of the cushion fabric 40 and is, of course, precut to complement the dimensions and design of the piece of furniture. Decorative fabric 42 is enclosive of the chair frame members including the cushion 50, generally in the manner illustrated.

At this point, it should be appreciated that conventional clips and brackets requiring securement to the upper edge or the outer surfaces of frame members are difficult to employ in replacing missing or damaged zigzag springs since the decorative fabric, cushion fabric, cushions, etc., must be removed in order that the replacement anchor bracket may be secured to the frame.

With the bracket of the present invention, however, the party desiring to replace the spring anchor bracket and employing the bracket of the present invention needs simply first predrill a hole in the frame member at the desired spot. Then, knowing generally the distance of the hole 29 downward from the upper leg 26, the user simply manipulates the bracket with his fingers, sliding the leg 27 upwardly and across the upper edge 17 and then downwardly as urged by the covering fabrics themselves so that the leg 27 is in surface abutment with the exterior surface 18 of the frame. The bracket is then manipulated laterally to bring the hole on the bracket leg into registry with the predrilled hole in the frame. The supplied machine screw having complementary threaded shaft is next inserted through the hole in the frame, possibly employing a washer as described earlier and thence threadingly engaging the hole in the leg 27 of the bracket 25 to bring the leg into firm surface abutment and providing a very firm anchor for the terminal end of the spring clip in the manner described.

From the foregoing description, it should be appreciated that the replacement of an anchor bracket is easily accomplished from the underside of the chair by one even only nominally skilled in basic tools. Installation would require only a drill and, of course, possession of the brackets of the present invention and possibly a screwdriver.

It will be appreciated that obvious modifications in the design of the bracket can be made by one nominally skilled and it is intended that all such modifications shall be included within the scope of the present invention unless they would do violence to the language of the appended claims.

I claim:

1. An anchor bracket for anchoring a replacement zigzag spring onto spaced parallel frame members of an assembled article of furniture such as a chair without removal of outer decorating fabric, padding or disassembly of the chair, said frame members each including facing inner surfaces, an upper edge and exterior surfaces normally covered with decorative fabric, said bracket including a first leg for abutting the exterior surface of said frame but inside said decorative fabric, a connected second leg extending across the upper edge towards said inner surface and zigzag spring engaging means formed in said second leg, said first leg having a threaded transverse hole in which the threads are characterized by a pitch as to be engaged by threads of a machine screw entering the hole from the direction of the interface of said leg and said exterior surface of said frame member, said directing corresponding to that proceeding from the inside of said chair.

2. An anchor bracket for anchoring replacement zigzag support springs on frames of articles of furniture such as a chair without removal of outer decorating fabric, padding or disassembly of the chair, said frames including at least two spaced generally parallel frame members having facing inner surfaces and exterior surfaces normally covered by decorative fabric and said frames having an upper edge surface, said bracket comprising a generally planar elongate band of metal bent on transverse axes to form a first frame fastening leg adapted for flush abutment with an outer surface of one of said frames, a spring engaging leg generally normal to said first leg and extending generally across said upper edge and a reverse bend leg formed at the extremity of said last-mentionedd leg, said reverse bend leg forming a recess adapted to receive an end of one of said springs, said frame fastening leg having a threaded transverse bore in which the threads are pitched to be engaged by a threaded machine screw entering the transverse bore at the interface of said frame fastening leg and said exterior surface of said frame, said pitch corresponding to that engageable by a machine screw proceeding from the inside of said parallel frame member.

3. In combination,
   1. a chair including a generally elongate seat or back frame member, said frame member including
      a. an inwardly facing surface,
      b. an outwardly facing surface covered by fabric or the like and
      c. a transverse bore extending from said inwardly facing surface to said outwardly facing surface,
   2. an anchor bracket as claimed in claim 1 located with its threaded transverse hole in registration with said bore in said frame member and said first leg flushly against said outwardly facing surface and
   3. a machine screw extending from said inwardly facing surface to said outwardly facing surface through said bore in said frame member to engage said threaded hole of said anchor bracket.

4. In combination, an anchor bracket, as claimed in claim 1, and a threaded machine screw in threaded engagement with said threaded transverse hole in said first leg in the manner described in claim 1.

* * * * *